Feb. 6, 1962 G. CHEROFF 3,020,411

PHOTOVOLTAIC DEVICES

Filed July 7, 1958 2 Sheets-Sheet 1

INVENTOR:
GEORGE CHEROFF

BY William V. Schelberg
AGENT

United States Patent Office 3,020,411

Patented Feb. 6, 1962

3,020,411

PHOTOVOLTAIC DEVICES

George Cheroff, Poughkeepsie, N.Y., assignor to International Business Machines Corporation, New York, N.Y., a corporation of New York Filed July 7, 1958, Ser. No. 746,682

13 Claims. (Cl. 250—208)

This invention relates to photosensitive materials capable of producing large photovoltages in response to light stimuli. More particularly, it relates to logical devices which may be constructed using these materials.

Photosensitive materials, such as activated zinc sulfide, have been known to be D.C. electroluminescent, i.e., the application of the D.C. electric field results in a constant light output which is characteristic of one of the activators present in the lattice. For example, an article by R. H. Bube, entitled "Photoconductivity of the Sulfide, Selenide and Telluride of Zinc or Cadmium," appearing in the Proceeding of the I.R.E., vol. 43, December 1955, on pages 1836–1850 and references cited therein describe some of the physical and optical characteristics of these materials.

This invention, however, is based on a discovery that these above-mentioned materials are also photovoltaic, i.e, they produce an open circuit photovoltage upon irradiation with light. Furthermore, it is another characteristic of the materials of this invention that they are capable of producing photovoltages of an order larger than the energy or band gap of the material. The photovoltages exhibited by the materials of this invention may be of positive or negative polarity, depending upon the particular wave length and intensity of the incident light radiation. An example of such a material is zinc sulfide. Another example is zinc sulfide, activated with small amounts of metallic ions. The properties of these materials may be utilized in conjunction with other light-sensitive elements to provide apparatus capable of performing logical functions useful in computer circuitry.

Accordingly, an object of this invention is to prepare new and novel photovoltaic materials exhibiting large photovoltages.

Another object of this invention is to provide photovoltaic elements suitable for use and application in computer circuitry.

Still another object of this invention is to construct apparatus for performing logical functions.

Other objects of the invention will be pointed out in the following description and claims and illustrated in the accompanying drawings, which disclose, by way of example, the principle of the invention and the best mode, which has been contemplated of applying the principle.

In the drawings:

FIG. 1*a* is a plot showing the dependency of photovoltage upon the wave length of incident life for activated zinc sulfide single crystals.

FIG. 1*b* shows a similar plot for unactivated zinc sulfide.

The photovoltaic element or all of the present invention comprises a photovoltaic crystal with electrode means attached thereto. Light incident upon such a cell causes a photovoltage to be developed which is of an order larger than the characteristic band gap of the material. The photovoltages may be measured by balancing the voltage to zero using an electrometer as a null indicator. According to the practice of this invention, the photovoltaic elements are prepared by electroding the base crystal with a conductive material, such as In—Hg. The photovoltaic material may take the form of single crystals, powdered layers, or films, although single crystals are preferred. Photovoltaic single crystals of zinc sulfide, activated with small amounts of metallic ions may be prepared for use in such an element by mixing ZnS "Luminescent" grade with 0.1 part $CuSO_4$, 0.08 part $Al_2(SO_4)_3.18H_2O$ and 4.0 parts $MnCO_3$. The mixture is fired at 1200° C. for one hour in an atmosphere of $H_2S$, washed with KCN solution and the resulting powder placed in a sealed quartz tube containing about 100 mm pressure of $H_2S$. The tube is then placed in a furnace having a temperature gradient and kept in the hottest region at about 1200° C. for periods of 50–100 hours. Activated crystals grow from the vapor phase and deposit in the cooler region of the tube. The resultant crystals possess the same concentration of activators as is present initially in the phosphor mix, according to spectrographic analysis. A similar sublimation technique is used to grow unactivated base crystals. The ZnS for such preparations, however, is preferably prepared by heating Zn contained in a graphite boat in a stream of $H_2S$ bubbled through a $Ba(OH)_2$ solution. The resultant crystals are colorless to the eye and show only extremely slight fluorescence under the action of UV light. Since concentrations of Cu of the order of 1 part in $10^5$–$10^6$ are effective in slightly darkening the crystals and making them fluoresce, these ZnS crystals are of rather high purity. Crystals thus prepared are in the shape of cylinders of hexagonal cross-section with lengths between 2 and 10 mm. and the thicknesses in the range of 1 mm. The long axis of the cylinder is the C-axis and the crystal is essentially completely hexagonal.

Figure 1A:
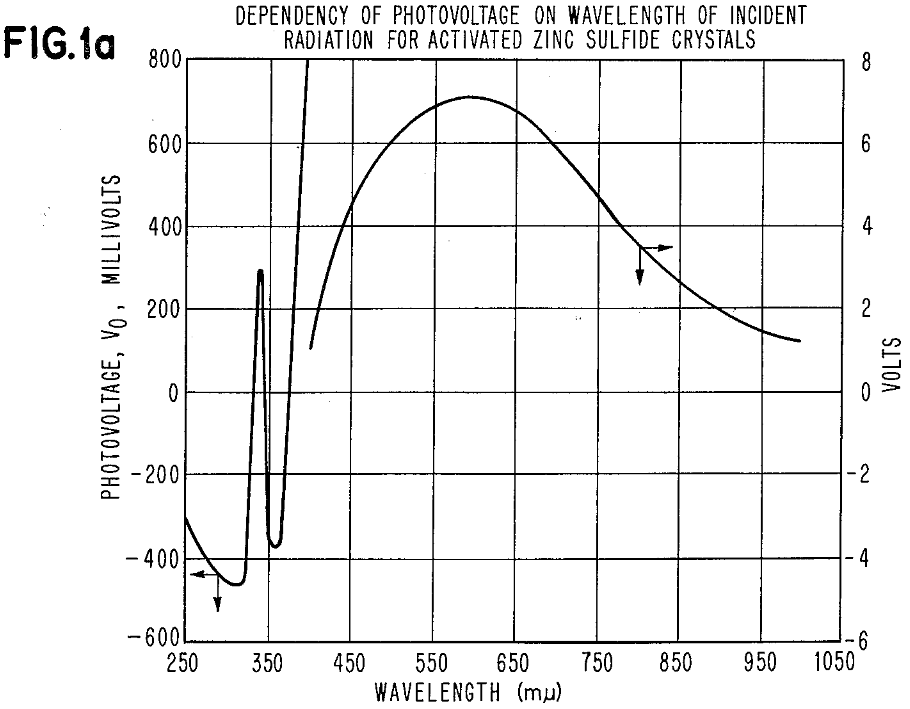
Figure 1B:
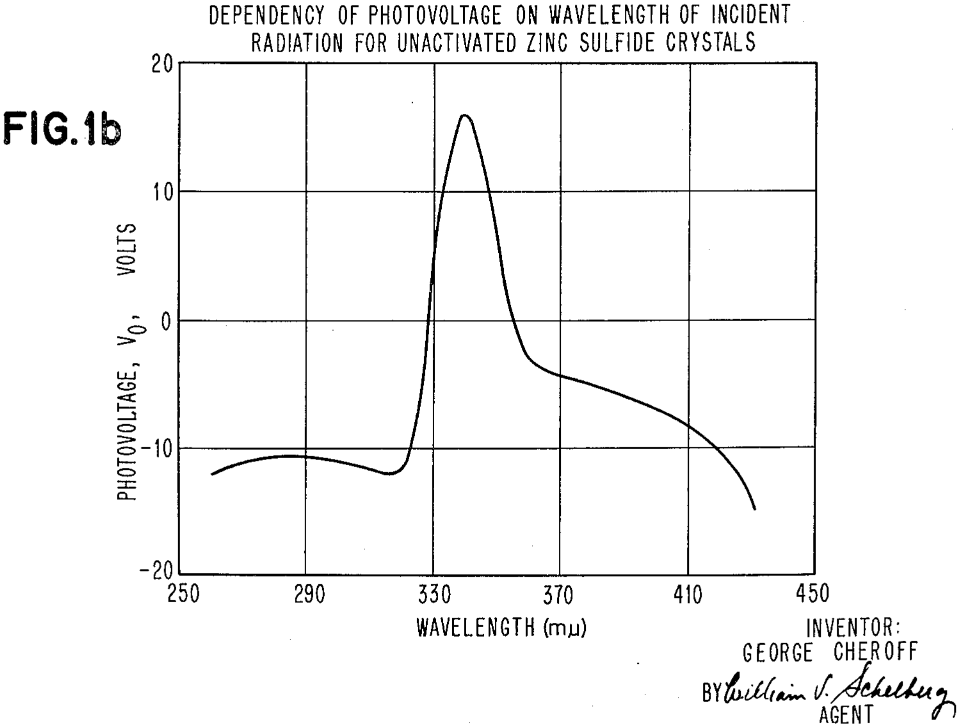
Figure 2:
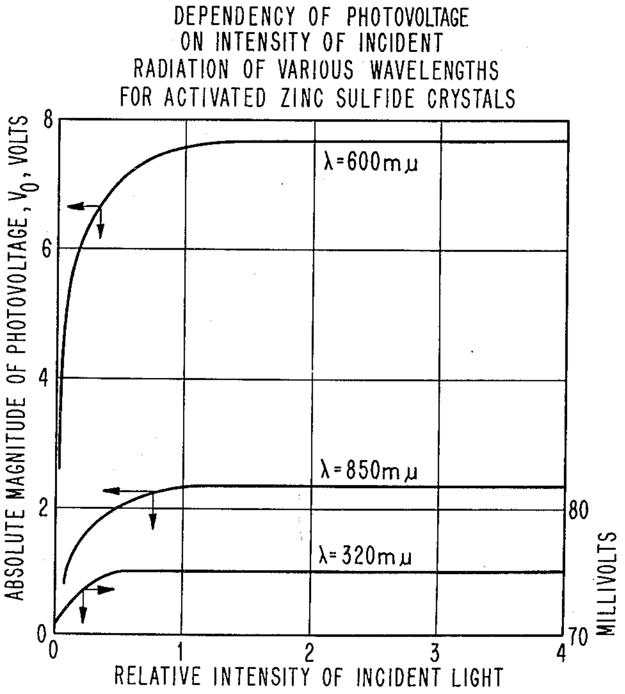
FIG. 2 is a graph in which the variation of photovoltage with relative intensity of incident light is plotted for various wave lengths for activated zinc sulfide.

Some of the properties of photovoltaic elements prepared according to the methods described above may be illustrated by reference to FIGS. 1*a*, 1*b*, and 2. FIGURE 1*a* depicts the dependency of photovoltage on the wavelength of incident radiation for zinc sulfide crystals activated with Cu, Mn and Al ions. These crystals have voltages as high as 20 volts per cm. in the visible region. The photovoltage is independent of the nature of the electrode material and varies linearly with the length of the crystal. The photovoltaic crystals show a reversal in sign of photovoltage in four regions of the spectrum. If two or more ligh' inputs of proper wavelength, one producing positive photovoltage, and the other negative photovoltage of an equivalent magnitude are incident upon such a crystal, zero photovoltage will be produced. FIG. 1*b* shows a similar plot for unactivated crystals with a reversal in sign of photovoltage occurring at 330 m$\mu$ and 345 m$\mu$. FIG. 2 shows a plot of photovoltage versus intensity of incident light radiation for ZnS single crystals activated with CU, Al and Mn ions. This dependency provides another parameter by which two light inputs of given wavelengths incident upon such a photovoltaic element may be balanced out to provide a zero output signal, namely the adjustment of the light intensity of one of the input signals to produce a photovoltage of equal and opposite magnitude to that produced by the other light input.

The materials of this invention exhibit short circuit photovoltaic currents of about $10^{-10}$ amperes per $cm.^3$ with corresponding photovoltages of about 20 volts when irradiated with monochromatic light. These photocurrents may be increased greatly by using larger crystals, assembling a plurality of such crystals in parallel and by using polychromatic incident radiation. The photovoltaic materials of this invention convert light energy to electrical energy with about the same efficiency as that found for solar batteries, or about 1%.

The photovoltaic cell described above may be used with other light sensitive elements, namely a D.C. electroluminescent cell and a photoconductor, to construct apparatus which may be made to function as useful logical circuits.

Figure 3:
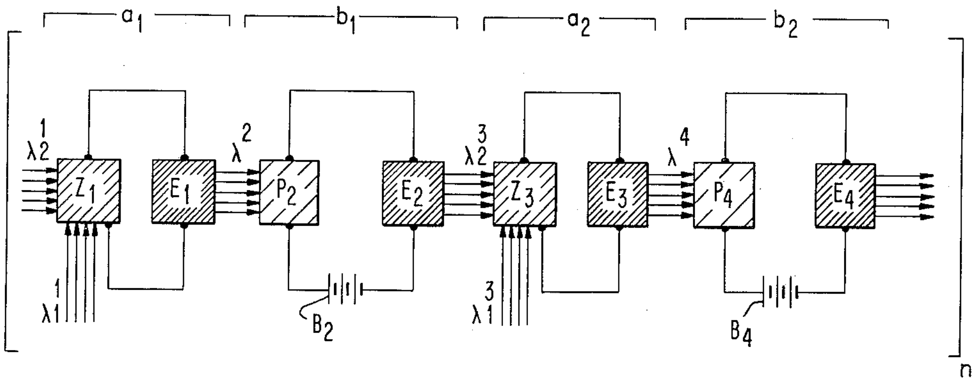
FIG. 3 is a diagrammatic representation of apparatus, including the photovoltaic element of FIG. 1, used for performing logical functions.

One embodiment of such circuitry is shown in FIG. 3, a long chain "exclusive or" circuit. Only two unit chains are shown, but there is no theoretical limit on the length of the chain. Each logical stage, $a_1$, $a_3$, . . . $a_n$, is coupled through means $b_1$ such that $a_1$ operates on $a_2$, $a_2$ on $a_3$, etc. to provide the continuous "exclusive or" function, $a_1 \forall a_2 \forall a_3 \ldots \forall a_n$. In the embodiment described, E is a D.C. electroluminescent cell, such as silicon carbide; P, a photoconductor, as for example, cadmium sulfide; and B a voltage supply. In designating the light radiation $\lambda$, the superscript number refers to the number of the element on which that light radiation is incident. The subscript number refers to the wavelength and intensity of the light radiation. According to the notation, $\lambda_2^2$ and $\lambda_2^3$, for example, are light signals of the same wavelength and intensity on elements $P_2$ and $Z_3$, respectively. To illustrate the circuit in operation, assume an input $\lambda_1^1$ is incident on $Z_1$; thereby a photovoltage is developed in the $a_1$ stage, causing $E_1$ to electroluminesce such that $\lambda_2$ is incident on $P_2$. The resistance of $P_2$ is thus lowered sufficiently so that there is developed on $E_2$ a voltage sufficient to cause $E_2$ to electroluminesce. The voltage source $B_2$ is provided in the $b_2$ unit to adjust the intensity of the light output $\lambda_2^3$ emitting from $E_2$ such that when both $\lambda_2^3$ and $\lambda_1^3$ are incident upon $Z_3$, no output signal at $E_4$ will be received. All $b$ units may be similarly provided. If only $\lambda_2^3$ or $\lambda_1^3$ is incident upon $Z_3$, a signal will be generated at $E_4$ in the form of a light output $\lambda_2^5$. For example, if $Z_3$ is unactivated single crystals of zinc sulfide and the light inputs $\lambda_2^3$ and $\lambda_1^3$ are 328 m$\mu$ and 346 m$\mu$ respectively, and both are of the proper intensity, adjusted according to the graph shown in FIG. 2, zero photovoltage will be developed at $Z_3$ and hence no output signal at $E_4$.

Another embodiment of the invention utilizes inputs $\lambda_1^1, \lambda_1^3, \lambda_1^5, \ldots \lambda_1^{2n-1}$ where $n=1, 2, 3, 4$, etc. of polychromatic light radiation. These inputs are, in turn, adjusted according to a photovoltage vs. intensity of radiation dependency such as is given in FIG. 3 to provide zero output when both inputs are on.

The long chain "exclusive or" circuit has utility as a redundancy checker. A code which is supposed to be even at all times is fed into this circuit as the inputs $\lambda_2^1\lambda_1^1\lambda_1^3\lambda_1^{2n-1}$ where $n=1, 2, 3, 4$, etc. to each logical stage. A signal received from the checking circuit indicates an error was committed in crediting the code. To check a code which is supposed to be odd, its signals are used as inputs in an odd checking circuit. No output will be received from the circuit if the code is in error. Stated in another way, a feature of the circuit of this invention is that when any sequence of signals such as 1, 0, 0, 0, 1, 1, 1, etc. is supplied as inputs to the logical stages, an output will be received at the last stage if there is an odd number of "1" inputs, but that no output will be received if an even number of "1" inputs are applied.

An "inclusive or" circuit, $a_1 \ldots \vee \ldots a_2 \ldots \vee \ldots a_3 \ldots \vee \ldots a_n$ may be easily constructed from the circuit shown in FIG. 3 by making the light inputs to any Z element of the proper wavelength and light intensity, such that a photovoltage is generated when either or both of said inputs are on.

Using the basic logical circuits shown herein, a wide variety of other logical circuits may be constructed, including flip-flops, triggers, shift registers, etc.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the following claims.

What is claimed is:

1. Apparatus for performing logic comprising, in combination, a plurality of logical stages connected in sequence, each of said stages including a photovoltaic element having a first and a second light input means associated therewith, said element being capable of producing photovoltage upon irradiation by only one of either of said light inputs, and an electrosensitive element connected with said photovoltaic element and operatively responsive thereto to produce a light output, said light output becoming said first light input to the following photovoltaic element.

2. Apparatus according to claim 1 wherein said photovoltaic element consists essentially of zinc sulfide.

3. Apparatus for performing logic comprising, in combination, a plurality of logical stages connected in sequence, each of said stages including photovoltaic element having a first and a second light input means associated therewith, said element being capable of producing photovoltage upon irradiation by only one of either of said light inputs, and electrosensitive element connected with said photovoltaic element and operatively responsive thereto to produce a light output and means for converting said light outputs to become first light inputs of given wavelength and intensity to the following photovoltaic element.

4. Apparatus for performing logic comprising, in combination, a plurality of logical stages connected in sequence, each of said stages including a photovoltaic element having a first and a second light input means associated therewith, said element being capable of producing photovoltage upon irradiation by only one of either of said light inputs and an electrosensitive element connected with said photovoltaic element and operatively responsive thereto to produce a light output, and means for converting said light outputs to become first light inputs of given wavelength and intensity to the following photovoltaic element, wherein said means connecting said stages includes a photoconductive material, an electrosensitive element and a voltage supply.

5. Apparatus for performing logic comprising in combination, a plurality of logical stages connected in seequence, each of said stages including a photovoltaic element having a first and a second light input means associated therewith, said element being capable of producing photovoltage upon irradiation with at least one of said light inputs and an electrosensitive element connected with said photovoltaic element and operatively responsive thereto to produce a light output, said light output becoming said first light input to the following photovoltaic element.

6. Apparatus for performing logic comprising, in combination, a plurality of logical stages connected in sequence, each of said stages including a zinc sulfide photovoltaic element having a first and a second light input means associated therewith, said element being capable of producing photovoltage upon irradiation with at least one of said light inputs, and an electrosensitive element connected with said photovoltaic element and operatively responsive thereto to produce a light output, said light output becoming said first light input to the following photovoltaic element.

7. A logical device for performing the function "exclusive or" comprising in combination a wavelength sensitive, bipolar, photovoltaic element capable of producing either of two opposite states of photovoltage upon irradiation with light of a suitable wavelength and intensity; means for applying first and second light inputs thereat, the first of said light inputs being at a wavelength and intensity at which said material produces a first photovoltage, the second of said light inputs being at a wavelength and intensity at which the material produces an opposite photovoltage of equal magnitude to that produced by said first light input means; and means for detecting said photovoltage produced by said material upon irradiation by only one of either of said light inputs.

8. The device according to claim 7 wherein the photovoltaic material is selected from the group consisting of zinc sulfide and activated zinc sulfide.

9. An odd-even checking circuit comprising in combination a plurality of logical stages connected in sequence, each of said stages including a logical device for performing the function "exclusive or," said device comprising in combination a wavelength sensitive, bipolar, photovoltaic element capable of producing either of two opposite states of photovoltage upon irradiation with light of a suitable wavelength and intensity, light sources for applying first and second light inputs thereat, the first of said light inputs being at a wavelength and intensity at which said material produces said first photovoltage, the second light input being at a wavelength and intensity at which said material produces an opposite photovoltage of equal magnitude to that produced by said first light input, and means for detecting said photovoltage produced by said material upon irradiation of only one of either said light inputs.

10. A logic circuit comprising a bipolar photovoltaic cell device comprising a photovoltaic material capable of producing either of two opposite polarity photovoltages upon irradiation with light of a suitable wavelength and magnitude, illuminating means for said cell comprising two selectively actuable light sources of such wavelength and magnitude that photovoltages are produced in said cell whose polarity and magnitude are dependent upon the combination of the two light sources actuated at a given time and means including two electrodes connected to said cell for detecting the polarity and magnitude of the voltage produced.

11. A logic circuit as set forth in claim 10 wherein the photovoltaic material consists essentially of zinc sulfide.

12. A logic circuit as set forth in claim 10 wherein the photovoltaic material consists essentially of activated zinc sulfide.

13. A logic circuit as set forth in claim 10 wherein the photovoltaic material consists essentially of zinc sulfide activated with copper, aluminum and manganese.

References Cited in the file of this patent

UNITED STATES PATENTS

| | | |
|---|---|---|
| 2,652,501 | Wilson | Sept. 15, 1953 |
| 2,706,792 | Jacobs | Apr. 19, 1955 |
| 2,895,054 | Loebner | July 14, 1959 |
| 2,949,538 | Tomlinson | Aug. 16, 1960 |

OTHER REFERENCES

Lange: Transactions of the Electrochemical Society, vol. 63; May 1933 (pp. 51–63).

Marshall et al.: Proceedings of the Association of Computing Machinery, May 2 and 3, 1952; pp. 159–163.

Mellon Institute of Industrial Reesarch; Quarterly Report No. 3, Second series; April 1, 1954, June 30, 1954.

Reynolds et al.: Physical Review; Oct. 15, 1954, vol. 96; pp. 533, 534.

Bube: Proceedings of the IRE; vol. 43; No. 12; December 1955, pp. 1836–1850.

Loebner: Proceedings of the IRE; vol. 43; No. 12, December 1955, pp. 1897–1906.

Tomlinson et al.: Journal of the British IRE; vol. 17; No. 3; March, 1957; pp. 141–154.